Oct. 9, 1951                W. M. BISHOP               2,570,912
METHOD AND MEANS FOR LOCATING NONLINEARITIES
IN INACCESSIBLE CABLES
Filed Feb. 10, 1950

INVENTOR
W. M. BISHOP
BY
     *W. R. Dawson*
ATTORNEY

Patented Oct. 9, 1951

2,570,912

UNITED STATES PATENT OFFICE 2,570,912

METHOD AND MEANS FOR LOCATING NON-LINEARITIES IN INACCESSIBLE CABLES

Walter M. Bishop, Flushing, N. Y., assignor to Bell Telephone Laboratories, Incorporated, New York, N. Y., a corporation of New York Application February 10, 1950, Serial No. 143,493

3 Claims. (Cl. 179—175.31)

This invention relates to a method and means for testing long, inaccessible electrical cables, and particularly to a method and means for testing long submarine cables used for the transmission of intelligence by telephony or telegraphy.

The object of the invention is a method and means for indicating, at an accessible point in the cable, the presence of transmission irregularities in an inaccessible length of the cable.

A feature of the invention is a method and means for testing a long electrical cable by supplying to the cable at an accessible point two carrier waves having frequencies such that, when the carrier waves are caused by a transmission irregularity to intermodulate, one of the products of the intermodulation will be a product wave having a velocity of transmission substantially differing from the velocity of transmission of one of the carrier waves.

Another feature of the invention is the modulation of one, or both, of the carrier waves with a low frequency wave.

Another feature of the invention is the selection and demodulation, at the receiving point, of the carrier wave and the intermodulation product which differs therefrom in velocity of transmission, and the separate recording of the low frequency modulations of these waves.

A further feature of the invention is in suddenly cutting off the low frequency modulation of the carrier waves, measuring the recorded time interval between the cessations of the recorded low frequencies from one carrier wave and the product wave, and determining therefrom the distance from the receiving end to the transmission irregularity which caused the carrier waves to intermodulate.

In recent years, the use of long cables for the transmission of intelligence, such as telephone and telegraph cables has been rapidly increasing; though, due to the transmission losses in such cables, the transmitted waves must be amplified at rather short intervals, thus necessitating the use of amplifying repeaters spaced some thirty to fifty miles apart along the cable. In submarine cables, these repeaters may be encased within an enlargement of the cable sheath; and, with skillful design and careful manufacture, the average life of the repeaters is comparable with the useful life of the cable. Occasionally, however, a repeater will have a useful life less than the average, thus, it is important to be able to test the electrical condition of each repeater from some accessible spot, so that a gradual deterioration in any repeater may be detected before service is materially affected, and arrangement may be made to repair or replace the faulty repeater in a season of the year when weather conditions are favorable for such work.

The cable, repeaters and associated equipment are constructed to produce a transmission characteristic as nearly linear as possible, but, the gradual deterioration of a repeater, or other item of the equipment, may produce a non-linearity in the transmission characteristic. Now, when two waves of the same, or different, frequencies are supplied to a cable system having a linear transmission characteristic, the waves will be transmitted individually without interaction; but, if some part of the cable system has a non-linear transmission characteristic, the two waves will interact to produce intermodulation products, which are other waves having frequencies related to the frequencies of the original waves.

It has been found that the velocities of propagation of sinusoidal waves over a long cable depend upon the frequencies of the waves, the higher frequency waves being propagated at somewhat higher velocities than the lower frequency waves. For example, a typical submarine cable for the transmission of carrier waves having frequencies between 12 kilocycles per second and 120 kilocycles per second, containing per nautical mile, 450 pounds of central copper conductor, 300 pounds of polythene insulation and 500 pounds of concentric copper return conductor will have a velocity of propagation for waves of 12 kilocycles per second of say 97,000 nautical miles per second, and a velocity of propagation for waves of 50 to 100 kilocycles per second of say 102,000 nautical miles per second.

In accordance with the present invention, at some accessible point, such as the sending end of the cable, two carrier waves are supplied to the cable, having frequencies such that a product of the intermodulation of the carrier waves will have a velocity of propagation differing from the velocity of propagation of one of the carriers. For example, one of the carrier waves may have a frequency of 12 kilocycles per second and a velocity of 97,000 miles per second and the other carrier wave may have a frequency of 48 kilocycles per second so that one product of the intermodulation of these waves will be a product wave having a frequency of 60 kilocycles per second and a velocity of 102,000 miles per second; or one carrier wave may have a frequency of 12 kilocycles per second and a velocity of 97,000 miles per second and the other carrier wave a frequency of 60 kilocycles per second so that one product of the intermodulation of these waves will be a product wave having a frequency of 48 kilocycles per second and a velocity of say 101,000 miles per second; or one carrier wave may have a frequency of 48 kilocycles per second and the other carrier wave may have a frequency of 60 kilocycles per second and a velocity of 102,000 miles per second, so that one product of the intermodulation of these waves will be a product wave having a frequency of 12 kilocycles per second and a velocity of 97,000 miles per second. Many other combinations of carrier waves may be employed, and modulation products of higher order than the sum and difference products may be used.

The one, or both, of the carrier waves may be modulated by some convenient low frequency wave, of say, 100 cycles per second, before the carrier waves are supplied to the cable. When the carrier waves are caused by some transmission irregularity to intermodulate, the product wave will also be modulated in accordance with the low frequency wave.

At some accessible point, such as the receiving end of the cable, the one carrier wave, and the product wave, are individually selected by suitable filters, demodulated to produce the two low frequency waves, and these waves are respectively supplied to a suitable recorder, such as the string oscillograph described in the Bell Laboratories Record, vol. XIII, No. 5, January 1935. A timing wave of suitable frequency may also be supplied to one of the strings of the oscillograph.

The carrier waves are supplied for a short interval of time, sufficient to permit the system to reach the steady state, then the low frequency wave, or the one carrier wave modulated thereby, is cut off. When, at the transmission irregularity, the one modulated carrier wave ceases to be transmitted, the modulation of the product wave, or the product wave itself, will no longer be generated; and the one modulated carrier wave and the modulated product wave, will be propagated at their respective velocities of propagation to the receiving end. As these modulated waves respectively reach the receiving end, and are succeeded by unmodulated waves the records of the low frequency waves will respectively end, and, from the time interval between the cessations of the records of the low frequency waves, and the difference between the velocities of propagation of the one carrier wave and the product wave, the distance from the receiving point to the transmission irregularity may be determined.

Let the one carrier wave have a frequency of $f_1$ kilocycles per second and a velocity of propagation of $v_1$ miles per second; let the product wave have a frequency of $f_2$ kilocycles per second and a velocity of propagation of $v_2$ miles per second and let $d$ be the distance in miles from the transmission irregularity to the receiving point. Then $$t_1 = \frac{d}{v_1}$$

is the time for the one carrier wave to travel from the irregularity to the receiving point;

$$t_2 = \frac{d}{v_2}$$

is the time for the product wave to travel from the irregularity to the receiving point.

The distance between the points of cessation of the records of the two low frequency waves is a measure of $t_1 - t_2$, thus $$d = (t_1 - t_2) \frac{v_1 v_2}{v_2 - v_1}$$

Figure 1:
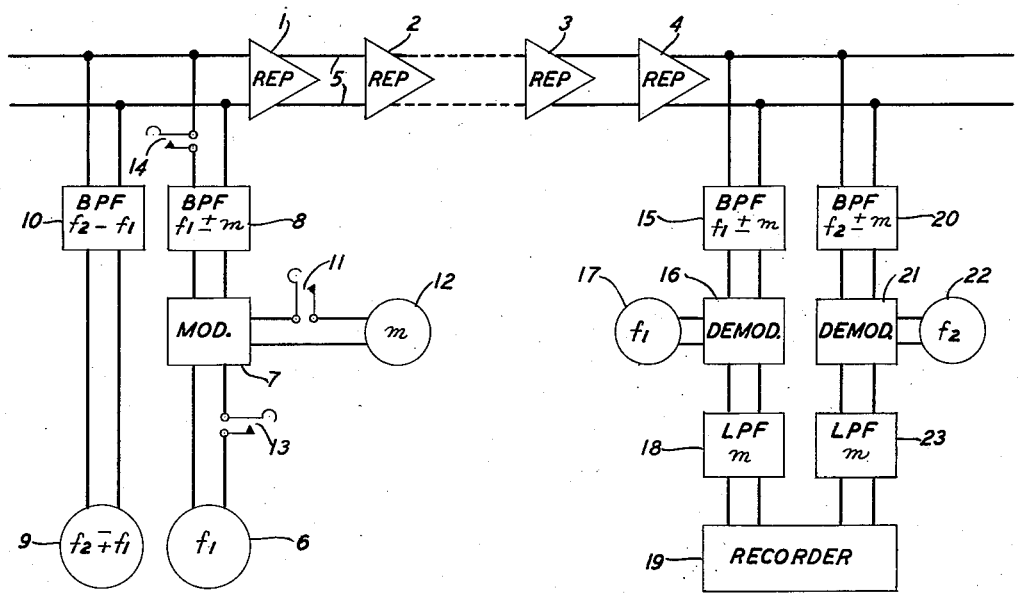
Fig. 1 shows in block schematic a typical system embodying the invention.

A plurality of repeaters 1, 2, 3, 4, etc., are embodied in the cable 5. A source 6, such as an oscillator, of one carrier wave of frequency $f_1$ is connected through a modulator 7 and a filter 8, passing the band of frequencies $f_1 \pm m$, where $m$ is a low frequency, to an accessible point of the cable 5. A second source 9, such as an oscillator, of a carrier wave of frequency $f_2 \mp f_1$, where $f_2$ is the frequency of a wave having a velocity of propagation differing from the velocity of propagation of the one carrier wave having a frequency $f_1$, is connected through a filter 10, passing the band of frequencies $f_2 \mp f_1$. A source 12, such as an oscillator, of waves of a low frequency $m$, may be connected by the switch 11 to the modulator 7 to modulate the waves from the source 6.

The waves passing the filter 8 are propagated over the cable 5, selected by the filter 15, passing the band of frequencies $f_1 \pm m$, and supplied to the demodulator 16. A source 17, such as an oscillator, supplies waves of frequency $f_1$ to the demodulator 17, and the products of demodulation are supplied to the filter 18, which passes the low frequencies $m$ to one string of the recorder 19.

If there be an element of the cable, such as a defective repeater, producing a non-linear irregularity in the transmission characteristic of the system, this element will cause the waves of frequencies $f_2 - f_1$ and $f_1 \pm m$, from the filters 8 and 10, to intermodulate. Among the products of this interdemodulation will be a product wave having a frequency $f_2 - f_1 + f_1 \pm m = f_2 \pm m$. This product wave will be selected by the filter 20, passing the band of frequencies $f_2 \pm m$, and supplied to the demodulator 21. A source 22, such as an oscillator, of waves of frequency $f_2$, is connected to the demodulator 21, and the products of demodulation are supplied to the filter 23, which passes the low frequency $m$ to a second string of the recorder 19.

At the start of the test, the switches 11, 13, 14, are closed, supplying the one modulated carrier wave, of frequency $f_1 \pm m$ to the cable. As soon as the system has reached the steady state, one, or all, of the switches 11, 13, 14 may be opened to cut off the supply of modulated carrier waves. If only the switch 11 be opened, unmodulated carrier waves will still be supplied to the cable, but these waves will not produce a record; also, the product wave produced by the intermodulation of this unmodulated carrier wave of frequency $f_1$ with the unmodulated carrier wave of frequency $f_2 \mp f_1$ will not have any low frequency modulation and will not produce a record.

Figure 2:
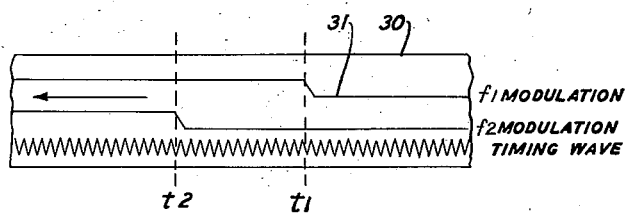
Fig. 2 shows a typical oscillograph record.

Fig. 2 shows a portion of a typical record from the recorder 19 in which the upper trace is the record of the low frequency modulation of the one carrier wave of frequency $f_1$, the center trace is the record of the low frequency modulation of the product wave of frequency $f_2$, and the lower trace is a constant frequency timing wave, the record moving in the direction of the arrow during recording.

Assuming the product wave has the higher velocity of propagation, the cessation of the low frequency wave, demodulated from this wave, will occur, as shown, at time $t_2$; and the cessation of the low frequency wave, demodulated from the one carrier wave will occur, as shown, at time $t_1$. The time interval $t_1-t_2$ may be determined from the number of cycles, and the portion of a cycle, of the timing wave between the lines through the points of cessation of the low frequency wave. Assuming $v_1=102,000$ miles per second, and $v_2=97,000$ miles per second, the distance in miles to the fault is approximately twice the time $t_1-t_2$ in microseconds. If the repeaters are spaced 40 miles apart, the time interval per repeater would be about 20 microseconds, and, assuming the recorded trace can be read to about $\frac{1}{16}$ of an inch, the record should move about $\frac{1}{16}$ of an inch in 20 microseconds.

What is claimed is:

1. The method of testing an electrical cable to determine the location of a section of the cable having a non-linear transmission characteristic which comprises supplying to the sending end of the cable a first electromagnetic carrier wave modulated in accordance with a low frequency and a second electromagnetic carrier wave, so that said waves will intermodulate in said section of the cable to produce a third modulated carrier wave having a velocity of transmission through the cable differing from the velocity of the first modulated wave, respectively selecting and demodulating at the receiving end of the cable both said modulated waves, indicating both the low frequency waves produced by such demodulation, interrupting the supply of said first wave to the cable, and measuring the time interval between the cessations of the receipts of said low frequency waves, to determine from said time interval the distance to said section of the cable.

2. The method of testing an electrical cable to determine the location of a portion of the cable having a non-linear transmission characteristic which comprises generating a first alternating electromagnetic wave of such frequency as to have a first velocity of propagation, modulating said first wave with a low frequency electromagnetic wave, generating a second alternating electromagnetic wave having a frequency such that said second wave may be intermodulated with said first wave by said portion of the cable to produce a product wave having a velocity of transmission differing from said first velocity, supplying said modulated first wave and said second wave to a point in said cable, selecting and demodulating at another point of said cable the modulated first wave and the modulated product wave, indicating both of the low frequency waves produced by such demodulation, interrupting the modulation of said first wave by said low frequency wave, and measuring the time interval between the cessations of the receipts of the low frequency waves from said demodulation, to determine from said time interval the distance to said portion of the cable.

3. Apparatus for testing an electrical cable to determine the location of a portion of the cable having a non-linear transmission characteristic comprising a modulator, a source of one alternating electromagnetic carrier wave having a known velocity of propagation through the cable, a source of low frequency waves, circuit means for connecting both said sources to said modulator, means for supplying the modulated output of said modulator to said cable, a source of a second alternating electromagnetic carrier wave having a frequency such that when said second wave is caused by said non-linear portion of the cable to intermodulate with said one wave a modulated product wave is produced having a velocity of propagation differing from the velocity of propagation of said one wave, means connecting the source of said second wave to said cable, first and second filters connected to said cable beyond said non-linear portion and respectively selecting said one modulated carrier wave and said modulated product wave, first and second demodulators respectively connected to said filters to derive the low frequency waves from said modulated waves, a recorder connected to said modulators to independently record the low frequency waves, means for interrupting the supply of said one modulated carrier to the cable, and means for determining the time interval between the cessations of the records of the low frequency waves, whereby the distances to said non-linear section of cable may be determined.

WALTER M. BISHOP.

REFERENCES CITED

The following references are of record in the file of this patent:

UNITED STATES PATENTS

| Number | Name | Date |
|---|---|---|
| 2,102,138 | Strieby | Dec. 14, 1937 |
| 2,315,383 | Andrews | Mar. 30, 1943 |
| 2,345,932 | Gould | Apr. 4, 1944 |
| 2,492,400 | Robertson | Dec. 27, 1949 |